United States Patent
Downer et al.

(10) Patent No.: US 6,934,835 B2
(45) Date of Patent: Aug. 23, 2005

(54) BUILDING BLOCK REMOVAL FROM PARTITIONS

(75) Inventors: Wayne A. Downer, Portland, OR (US); Bruce M. Gilbert, Beaverton, OR (US); Thomas D. Lovett, Portland, OR (US); Mehul M. Shah, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 10/045,774

(22) Filed: Jan. 9, 2002

(65) Prior Publication Data

US 2003/0131154 A1 Jul. 10, 2003

(51) Int. Cl.[7] ................................................. G06F 9/00
(52) U.S. Cl. ......................... 713/100; 712/15; 711/170
(58) Field of Search ............................... 713/1, 2, 100; 712/10, 11, 13, 15; 711/5, 170, 173

(56) References Cited

U.S. PATENT DOCUMENTS

| | | |
|---|---|---|
| 3,641,505 A | 2/1972 | Artz et al. |
| 5,799,146 A * | 8/1998 | Badovinatz et al. ............ 714/4 |
| 5,887,138 A | 3/1999 | Hagersten et al. |
| 5,893,144 A | 4/1999 | Wood et al. |
| 5,905,998 A | 5/1999 | Ebrahim et al. |
| 5,926,829 A | 7/1999 | Hagersten et al. |
| 6,035,378 A | 3/2000 | James |
| 6,049,853 A | 4/2000 | Kingsbury et al. |
| 6,075,938 A | 6/2000 | Bugnion et al. |
| 6,088,770 A | 7/2000 | Tarui et al. |
| 6,339,812 B1 * | 1/2002 | McCracken et al. ......... 711/141 |
| 6,345,317 B1 * | 2/2002 | Takeda ........................... 710/2 |
| 6,647,508 B2 * | 11/2003 | Zalewski et al. ............... 714/3 |

OTHER PUBLICATIONS

US 6,021,479, 2/2000, Stevens (withdrawn)

* cited by examiner

*Primary Examiner*—Thuan Du
(74) *Attorney, Agent, or Firm*—Abdy Raissinia

(57) ABSTRACT

Removing building blocks from partitions to which they have been bound is disclosed. A building block of a platform is removed from a partition of the platform by first halting activity by the partition on the building block. A first partition identifier of the building block indicates the partition of the building block. The building block joined the partition in a masterless manner. The resources of the building block are withdrawn from the partition, and the building block is deauthorized from the platform.

21 Claims, 9 Drawing Sheets

BUILDING BLOCK REMOVAL FROM PARTITIONS

CROSS-REFERENCE TO RELATED APPLICATIONS

The following patent applications, all assigned to the assignee of this application, describe related aspects of the arrangement and operation of multiprocessor computer systems according to this invention or its preferred embodiment.

U.S. patent application Ser. No. 10/045,798 by T. B. Berg et al., now U.S. Pat. No. 6,807,586, (BEA919990003US1) entitled "Method And Apparatus For Increasing Requestor Throughput By Using Data Available Withholding" was filed on Jan. 9, 2002.

U.S. patent application Ser. No. 10/045,927 by T. B. Berg et al., still pending, (BEA920000017US1) entitled "Method And Apparatus For Using Global Snooping To Provide Cache Coherence To Distributed Computer Nodes In A Single Coherent System" was filed on Jan. 9, 2002.

U.S. patent application Ser. No. 10/045,821 by T. B. Berg e at., now U.S. Pat. No. 6,785,779, (BEA920000018US1) entitled "Multi-level Classification Method For Transaction Address Conflicts For Ensuring Efficient Ordering In A Two-level Snoopy Cache Architecture" was filed on Jan. 9, 2002.

U.S. patent application Ser. No. 10/045,564 by S. G. Lloyd et al., still pending, (BEA920000019US1) entitled "Transaction Redirection Mechanism For Handling Late Specification Changes And Design Errors" was filed on Jan. 9, 2002.

U.S. patent application Ser. No. 10/045,797 by T. B. Berg et al., now U.S. Pat. No. 6,795,889, (BEA920000020US1) entitled "Method And Apparatus For Multi-path Data Storage And Retrieval" was filed on Jan. 9, 2002.

U.S. patent application Ser. No. 10/045,923 by W. A. Downer et al., still pending, (BEA920000021US1) entitled "Hardware Support For Partitioning A Multiprocessor System To Allow Distinct Operating Systems" was filed on Jan. 9, 2002.

U.S. patent application Ser. No. 10/045,925 by T. E. Berg et al., still pending, (BEA920000022US1) entitled "Distributed Allocation Of System Hardware Resources For Multiprocessor Systems" was filed on Jan. 9, 2002.

U.S. patent application Ser. No. 10/045,926 by W. A. Downer et al., now U.S. Pat. No. 6,823,498, (BEA920010030US1) entitled "Masterless Building Block Binding to Partitions" was filed on Jan. 9, 2002.

U.S. patent application Ser. No. 10/045,796 by W. A. Downer et al., still pending (BEA920010041US1) entitled "Masterless Building Block Binding To Partitions Using Identifiers And Indicators" was filed on Jan. 9, 2002.

BACKGROUND OF THE INVENTION

1. Technical Field

This invention relates generally to multi-processor computer systems, and more particularly to such systems in which there are a number of building blocks divided into a number of partitions.

2. Description of the Prior Art

There are many different types of multi-processor computer systems. A symmetric multi-processor (SMP) system includes a number of processors that share a common memory. SMP systems provide scalability. As needs dictate, additional processors can be added. SMP systems usually range from two to 32 or more processors. One processor generally boots the system and loads the SMP operating system, which brings the other processors online. Without partitioning, there is only one instance of the operating system and one instance of the application in memory. The operating system uses the processors as a pool of processing resources, all executing simultaneously, where each processor either processes data or is in an idle loop waiting to perform a task. SMP systems increase in speed whenever processes can be overlapped.

A massively parallel processor (MPP) system can use thousands or more processors. MPP systems use a different programming paradigm than the more common SMP systems. In an MPP system, each processor contains its own memory and copy of the operating system and application. Each subsystem communicates with the others through a high-speed interconnect. To use an MPP system effectively, an information-processing problem should be breakable into pieces that can be solved simultaneously. For example, in scientific environments, certain simulations and mathematical problems can be split apart and each part processed at the same time.

A non-uniform memory access (NUMA) system is a multi-processing system in which memory is separated into distinct groups. NUMA systems are similar to SMP systems. In SMP systems, however, all processors access a common memory at the same speed. By comparison, in a NUMA system, memory on the same processor board, or in the same building block, as the processor is accessed faster than memory on other processor boards, or in other building blocks. That is, local memory is accessed faster than distant shared memory. NUMA systems generally scale better to higher numbers of processors than SMP systems.

A particular type of NUMA system is the cache coherent NUMA (CC-NUMA) system. In a CC-NUMA system, the system hardware handles cache coherency between the system building blocks, as well as within them. That is, hardware cache coherency means that there is no software requirement for keeping multiple copies of data up to date, or for transferring data between multiple instances of the operating system or an application. Thus, distributed memory is tied together to form a single memory, and there is no copying of pages or data between memory locations. There is also no software message passing, but rather a single memory map having pieces physically tied together with sophisticated hardware.

The term building block is used herein in a general manner, and encompasses a separable grouping of processor (s), other hardware, such as memory, and software that can communicate with other building blocks. Building blocks can themselves be grouped together into partitions. A single partition runs a single instance of an operating system. A partition can include one or more building blocks. A system, or a platform, is the whole of all the partitions of all the building blocks. Thus, the building blocks of a platform may be partitioned into a number of partitions of the platform, and so on. Furthermore, two or more partitions can be grouped together as a cluster, where each partition runs its own operating system instance, but has access to shared storage with the other partitions. A cluster is therefore different than a partition, and a partition is different than a building block. The term node is not used herein, as it can sometimes refer to a partition, and other times refer to a building block.

Another particular type of NUMA system is the NUMA-quad (NUMA-Q) system. A NUMA-Q system is a NUMA system in which the fundamental building block is the quad, or the quad building block (QBB). Each quad can contain up to four processors, a set of memory arrays, and an input/output (I/O) processor (IOP) that, through two host bus adapters (HBAs), accommodates two to eight I/O buses. An internal switch in each QBB allows all processors equal access to both local memory and the I/O buses connected to the local I/O processor. An application running on a processor in one QBB can thus access the local memory of its own QBB, as well as the shared memory of the other QBBs. More generally, a quad refers to a building block having at least a collection of up to four processors and an amount of memory.

A difficulty with nearly any type of multi-processor computer system is the manner by which building blocks are bound together into partitions at startup. One approach involves selecting a master building block, which oversees the booting up of the other building blocks, as well as the partitioning of the building blocks into the desired partitions. However, this approach is not particularly fault-tolerant, in that should the master building block fail, the entire platform can potentially also fail, since there is no master overseeing the partitioning process. Redundant master building blocks and other ways to add fault tolerance to the system have been suggested, but can be overly complex and difficult to implement.

Another approach to binding building blocks into desired partitions at startup can be referred to as the masterless approach, in that no single building block is a priori designated as the master to oversee the binding process. Traditionally, however, the masterless approach has been plagued by race conditions and other difficulties. For example, two building blocks may decide to become the temporary master at the same time. However, having a preordained ordering of which building blocks are to temporarily retain master status is also problematic, because two otherwise identical building blocks may complete their startup processes in different lengths of time and/or at different times. Ensuring the orderly binding of building blocks into partitions is thus difficult to guarantee. Furthermore, removing such building blocks once they have been bound into partitions is also difficult to accomplish.

For these described reasons, as well as other reasons, therefore, there is a need for the present invention.

SUMMARY OF THE INVENTION

The invention relates to removing building blocks from partitions to which they have been bound. The adjectives first and second are used herein for distinguishing among different instances of the noun to which they relate. For example, the terms first physical port identifier and second physical port identifier use the adjectives first and second to distinguish between the former physical port identifier and the latter port identifier. The adjectives first and second have no other inherent or implied meaning other than their use for distinguishing purposes. A method of the invention removes a building block of a platform from a partition of the platform by first halting activity by the partition on the building block. A first partition identifier of the building block indicates the partition of the building block. The building block joined the partition in a masterless manner. The resources of the building block are withdrawn from the partition, and the building block is deauthorized from the platform.

A system of the invention includes a platform, a number of building blocks of the platform, and a number of partitions of the platform. Each building block has a physical port identifier that indicates its physical location in the platform, a partition identifier, and a logical port identifier indicating its logical location in the partition identified by the partition identifier. The partition identifier of each building block indicates one of the number of partitions to which the building block is bound in a masterless manner. The masterless manner uses the physical port identifiers, the logical port identifiers, and the partition identifiers of the number of building blocks to bind the blocks to partitions. One of the building blocks is removed from the partition indicated by its partition identifier and to which it has previously been bound.

An article of manufacture of the invention includes a computer-readable medium and means in the medium. The means in the medium is for removing a building block of a platform from a partition of the platform indicated by a first partition identifier of the building block, and to which the building block has joined in a masterless manner. The masterless manner uses the first partition identifier, a first physical port identifier, and a first logical port identifier, as well as second physical port identifiers, and second logical port identifiers of other building blocks of the platform to join the partition. The first physical port identifier indicates the physical location of the building block in the platform, and the first logical port identifier indicates the logical location of the building block in the partition identified by the first partition identifier.

Other features and advantages of the invention will become apparent from the following detailed description of the presently preferred embodiment of the invention, taken in conjunction with the accompanying drawings.

DESCRIPTION OF THE PREFERRED EMBODIMENT

Overview

Figure 1:
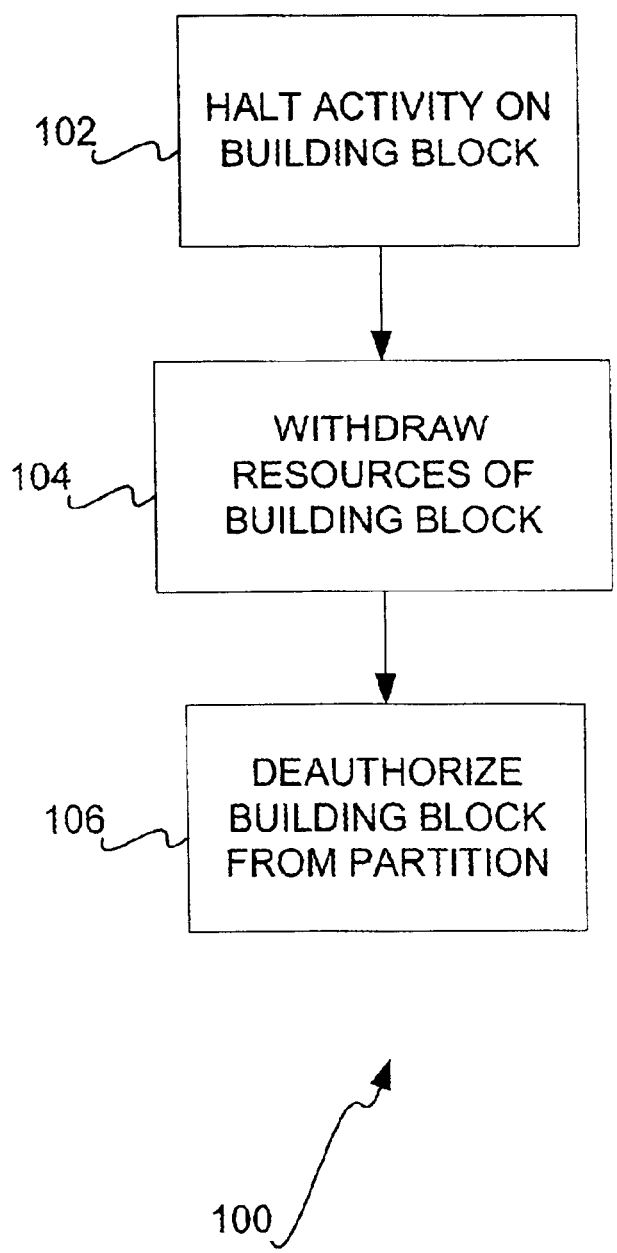
FIG. 1 is a flowchart of a method for removing a building block from a platform of a platform according to a preferred embodiment of the invention, and is suggested for printing on the first page of the patent.

FIG. 1 shows a method 100 for removing a building block of a platform from a partition of the platform to which the building block has been bound in a masterless manner, according to a preferred embodiment of the invention. The method 100, as well as other methods of the invention, can be implemented as a means in a computer-readable medium stored on an article of manufacture. The medium may be a recordable data storage medium, a modulated carrier signal, or another type of medium. Other components described in the detailed description can also be implemented as such means.

The method 100 is performed by a building block of a platform that has been bound to a partition of the platform. Partition activity on the building block, such as activity by other building blocks in the same partition, is first halted (102). This can entail halting usage of the building block's memory by the partition, halting input/output (I/O) activity on the building block, and/or halting processor tasks running on the building block. Next, the resources of the building block are withdrawn from the partition (104), and the building block is finally deauthorized from the partition (106). Deauthorization can involve turning off a commit indicator of the building block that is used to indicate whether the building block is committed to a partition.

Technical Background

Figure 2:
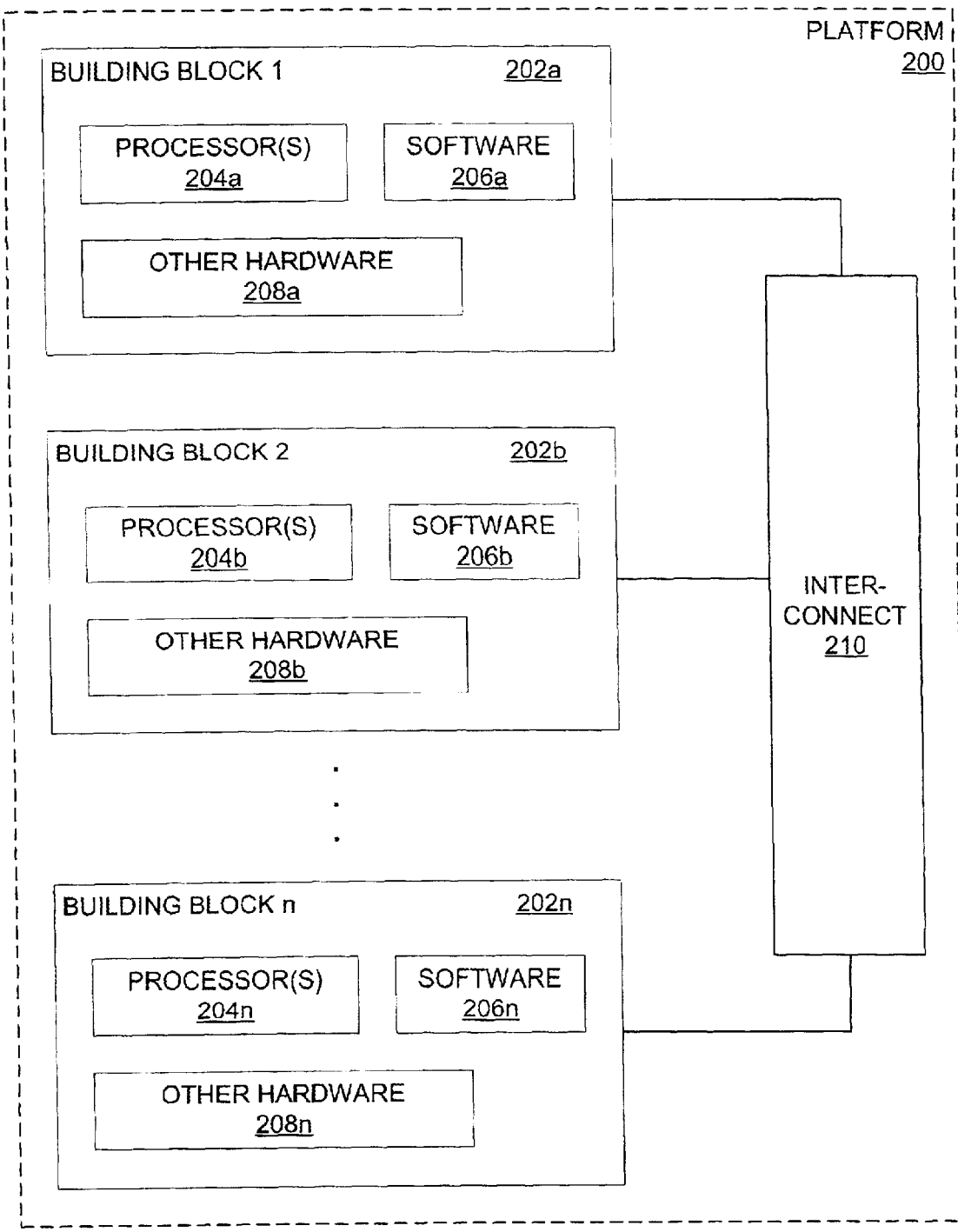
FIG. 2 is a diagram of an example platform having a number of example building blocks connected by an interconnect, in accordance with which embodiments of the invention may be practiced.

FIG. 2 shows an example platform 200 in conjunction with which embodiments of the invention may be practiced. The platform 200 includes a number of example building blocks 202a, 202b, . . . 202n, that are connected to one another via an interconnect 210. Each example building block has one or more processors, software, as well as other hardware, such as memory. For instance, the building block 202a has processor(s) 204a, software 206a, and other hardware 208a, whereas the building block 202b has processor(s) 204b, software 206b, and other hardware 208b. The building block 202n has processor(s) 204n, software 206n, and other hardware 208n. A building block can be non-restrictively defined as a grouping of at least one or more processors and memory, although the invention is not so limited.

The platform 200 itself can be a non-uniform memory access (NUMA) system, such as a cache-coherent (CC-NUMA) system, a NUMA-quad (NUMA-Q) system, and so on. Where the platform 200 is a NUMA-Q system, each example building block is a quad, or quad building block (QBB), having up to four processors, local memory, and input/output (I/O) hardware. The interconnect 210 may be a link, such as an IQ-link or a CC-link. The invention can also be implemented in conjunction with other systems, such as symmetric multi-processor (SMP) systems, and so on. The term platform as used herein is synonymous with the term system.

Figure 3:
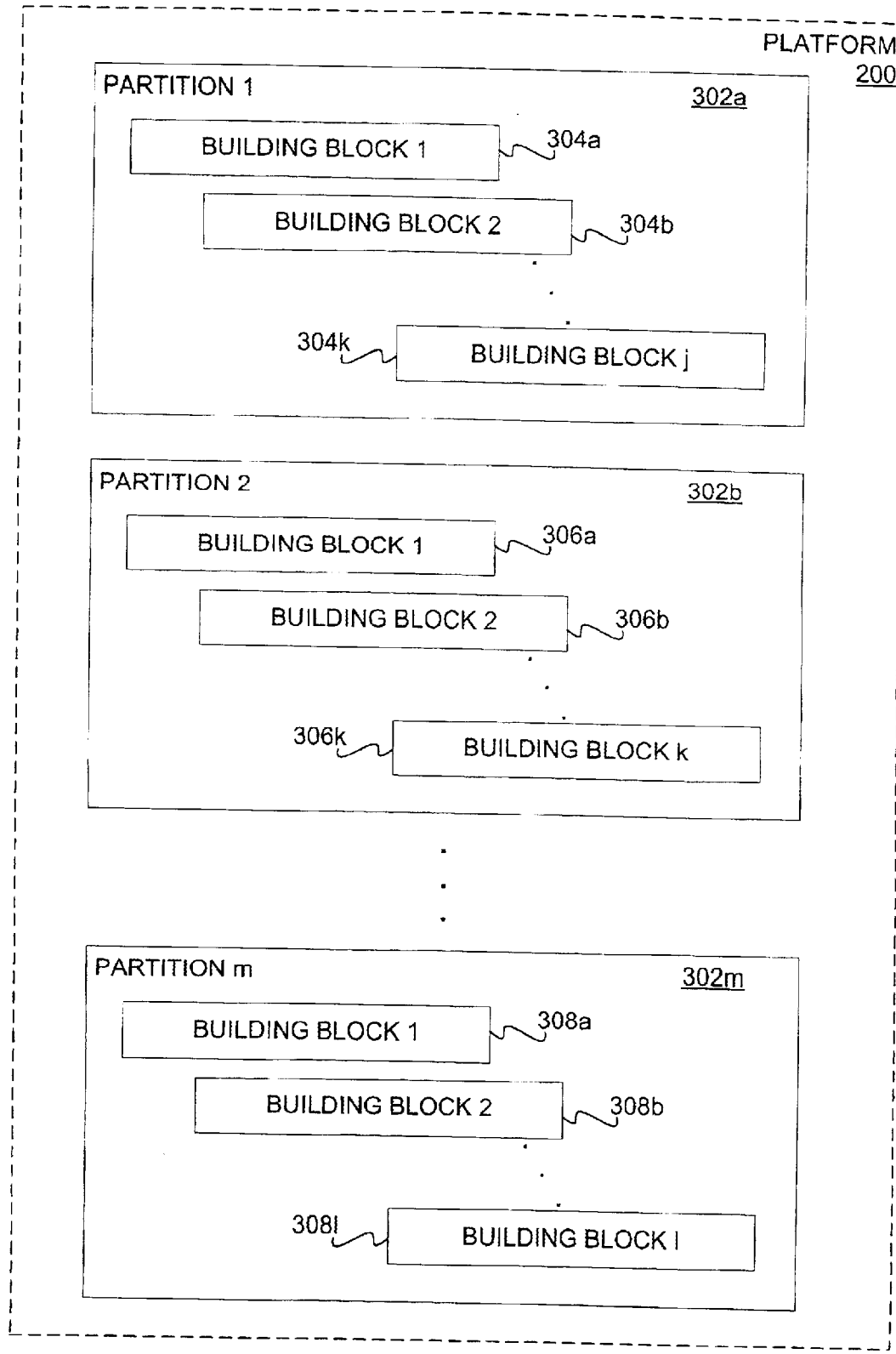
FIG. 3 is a diagram of the example platform of FIG. 2 showing the example building blocks having been partitioned into a number of example partitions, according to an embodiment of the invention.

FIG. 3 shows the platform 200 of FIG. 2 after the building blocks have been bound to different partitions 302a, 302b, . . ., 302m in accordance with an embodiment of the invention. The partition 302a has building blocks 304a, 304b, . . . , 304j bound thereto, whereas the partition 302b has bound thereto building blocks 306a, 306b, . . 306k. The partition 302m has bound thereto building blocks 308a, 308b, . . . , 308l. The building blocks 202a, 202b, . . . , 202n of FIG. 2 are inclusive of the building blocks 304a, 304b, . . . , 304j, 306a, 306b, . . . , 306k, and 308a, 308b, . . . , 308l. Each partition 302a, 302b, . . . , 302m can be non-restrictively defined as a group of one or more building blocks running a single operating system instance, although the invention is not so limited.

Figure 4:
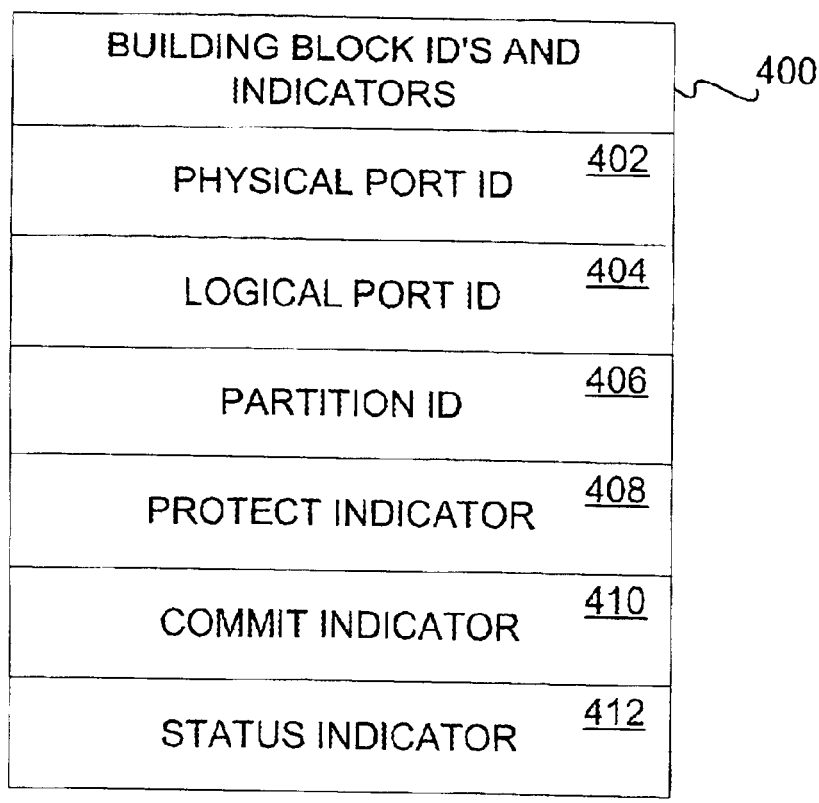
FIG. 4 is a diagram of building block identifiers and indicators used in conjunction with an embodiment of the invention.

FIG. 4 shows the identifiers and indicators 400 used by building blocks for masterless binding to partitions, according to an embodiment of the invention. Each building block has a set of the identifiers and indicators 400. The physical port identifier 402 identifies the physical location of the building block within a platform, whereas the logical port identifier 404 identifies the logical location of the building block within its partition. The physical port identifier 402 is typically a preset permanent identifier of the building block, whereas the logical port identifier 404 can be configured by a user, or automatically generated based on the physical port identifiers of the building blocks in the same partition that have been received.

The partition identifier 406 indicates the partition of the platform to which the building block is to be bound, and is typically set by the user. The protect indicator 408 indicates whether the building block has been write protected, whereas the commit indicator 410 indicates whether the building block has been bound, or committed, to its partition. The status indicator 412 indicates the status of the building block, such as whether it is booting up, whether it has been reset, and so on.

Binding Building Blocks to Partitions

Figure 5A:
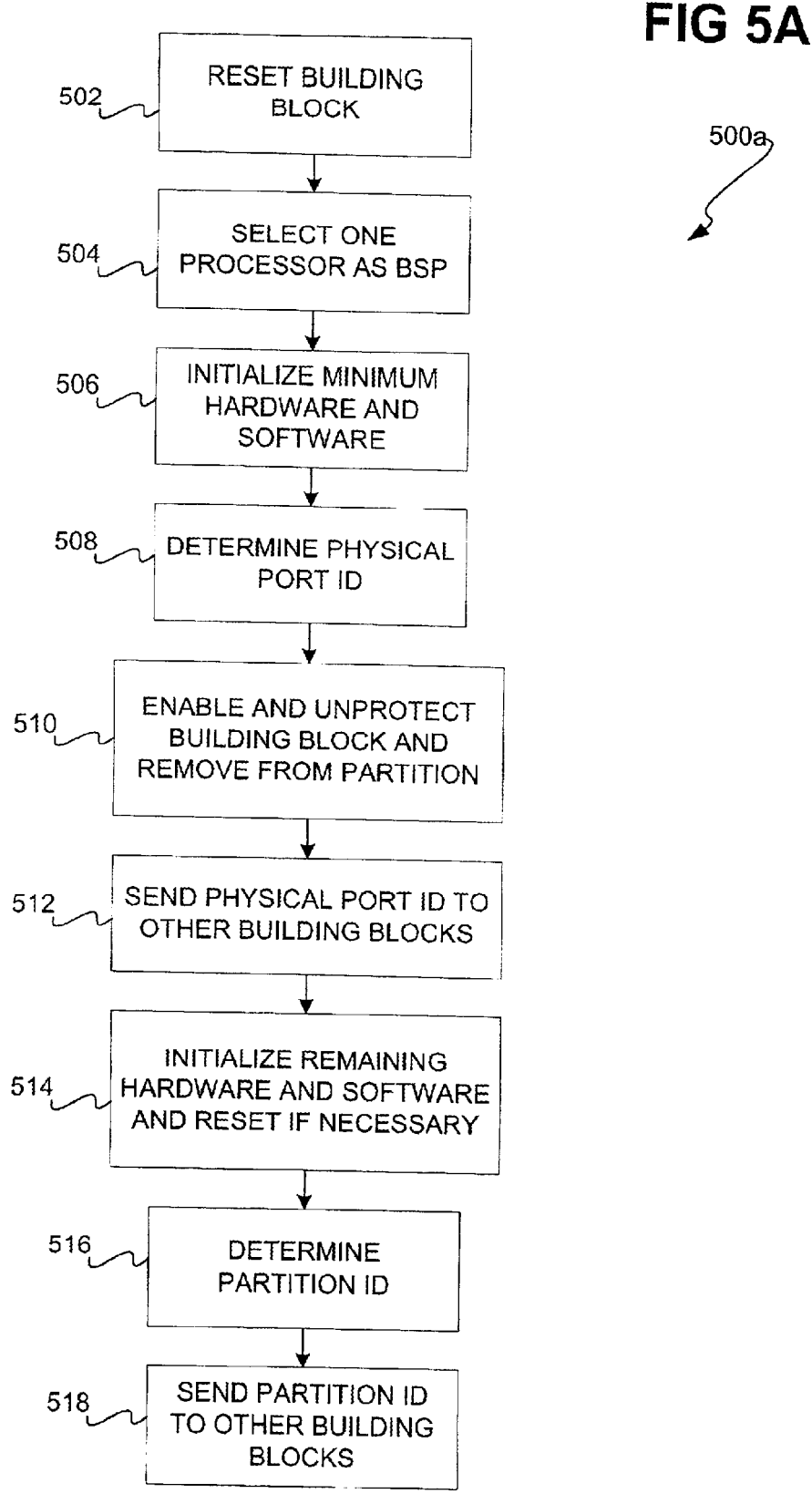
FIGS. 5A, 5B, 5C, and 5D are flowcharts of a method showing in more detail how one embodiment of the invention binds a building block of a platform to a partition of the platform.

FIGS. 5A, 5B, 5C, and 5D show how one embodiment of the invention binds building blocks of a platform to partitions of the platform, as the methods 500a, 500b, 500c, and 500d, respectively. The methods are performed by a building block of the platform relative to the other building blocks of the platform. The building block's status indicator is updated throughout the performance of these methods, to reflect the block's current status. Referring first to FIG. 5A, the building block is initially reset (502). This may include cycle resetting the building block, to start the boot process. Next, once all the processors of the building block have initialized themselves, one of these processors is selected as the boot service processor (BSP) for the building block (504), which performs the remainder of the methods 500a, 500b, 500c, and 500d.

The building block initializes its minimum necessary hardware and software (506), and determines its physical port identifier. The building block is enabled and unprotected, and removed from any partition to which it may currently be bound (508). Thus, the building block's protect indicator now indicates that the block is unprotected, and the building block's commit indicator now indicates that the block is not committed to any partition. The building block sends its physical port identifier to the other building blocks in the partition (512), and initializes any remaining hardware and software of the building block (514). This may entail resetting or rebooting the building block, such that the method 500a starts again at 502, and proceeds through 514. Once this has been accomplished, the building block determines its partition identifier (516), which is sent to the other building blocks of the platform (518).

Figure 5B:
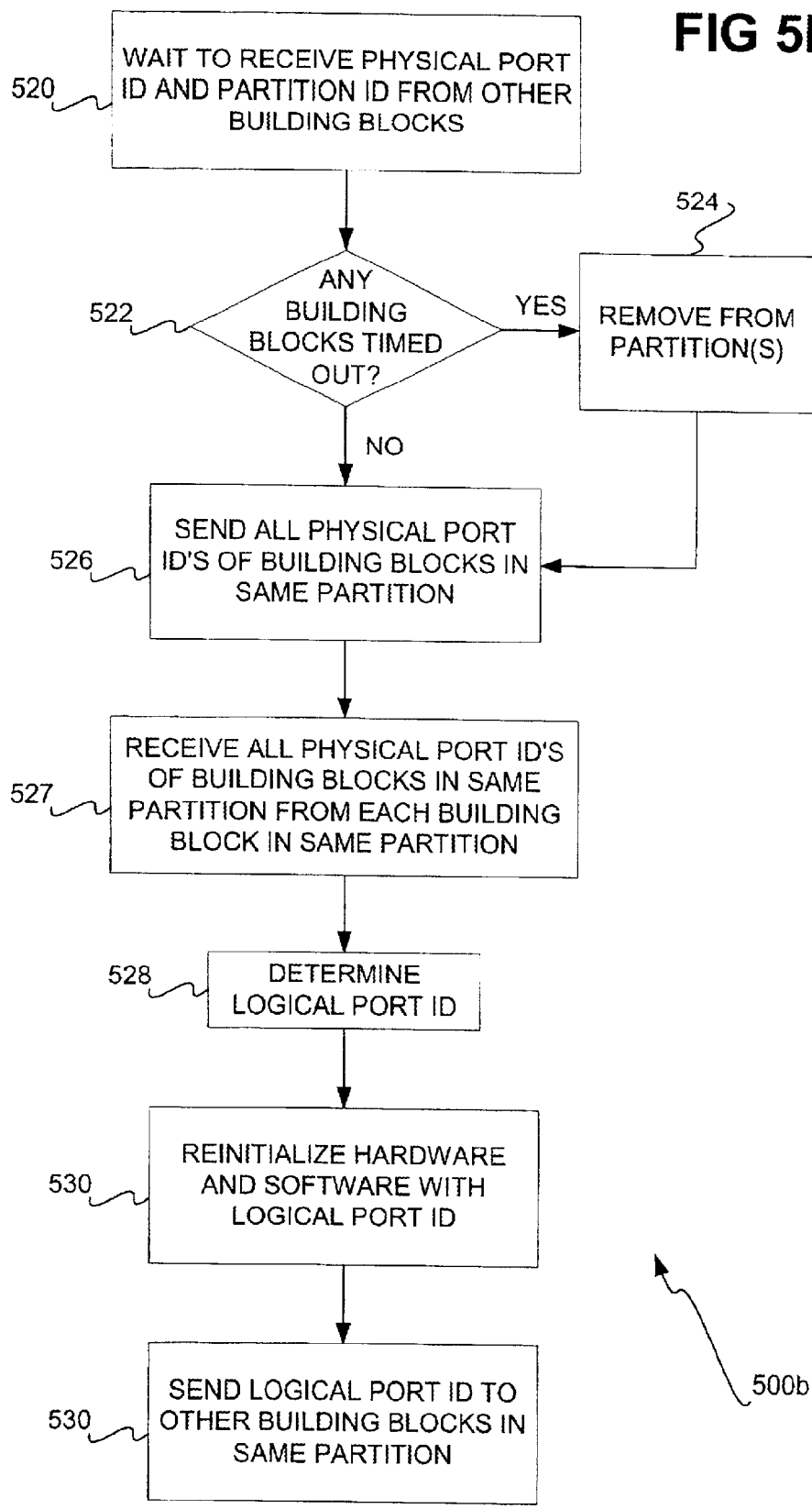

Referring next to FIG. 5B, the building block waits to receive the physical port identifiers and the partition identifiers of the other building blocks, from the other building blocks (520). This can entail waiting for a short period of time for the other building blocks to catch up through their performance of the method 500a of FIG. 5A. If any of the other building blocks is indicating only a physical port identifier, and not its partition identifier, then this likely means that such building blocks are resetting or rebooting themselves during performance of 514 of FIG. 5A, such that the waiting building block must wait for a longer period of time. The status indicator of such a building block can also be inspected.

One or more of the other building blocks may ultimately time out, meaning that they never send their physical port identifiers and/or their partition identifiers. If this occurs (522), then the method 500b removes such building blocks from any partitions to which they are currently bound (524). Next, the building block sends the physical port identifiers for all the building blocks having its same partition identifier to such building blocks (526). That is, the building block determines the subset of the other building blocks that have the same partition identifier as it does, and sends the physical port identifiers for these blocks to these blocks. Likewise, the building block receives from other building blocks in the subset these physical port identifiers (527).

The building block next determines its logical port identifier (528). The logical port identifier may be configured by the user or automatically generated based on the physical port identifiers of the building blocks in the same partition. The user may set the logical port identifier in-band through a setup program, or out-of-band through a service processor, where the identifier may then be stored in persistent storage. If the logical port identifier is not set by the user, then the building block with the lowest physical port identifier is assigned the lowest logical port identifier. The hardware and software of the building block is then reinitialized with the memory map for the logical port identifier assigned to the building block (530), and the logical port identifier is sent to the other building blocks in the same partition (532). At this stage, therefore, there is a different memory map for each building block, and the building blocks cannot access each other's memory.

Figure 5C:
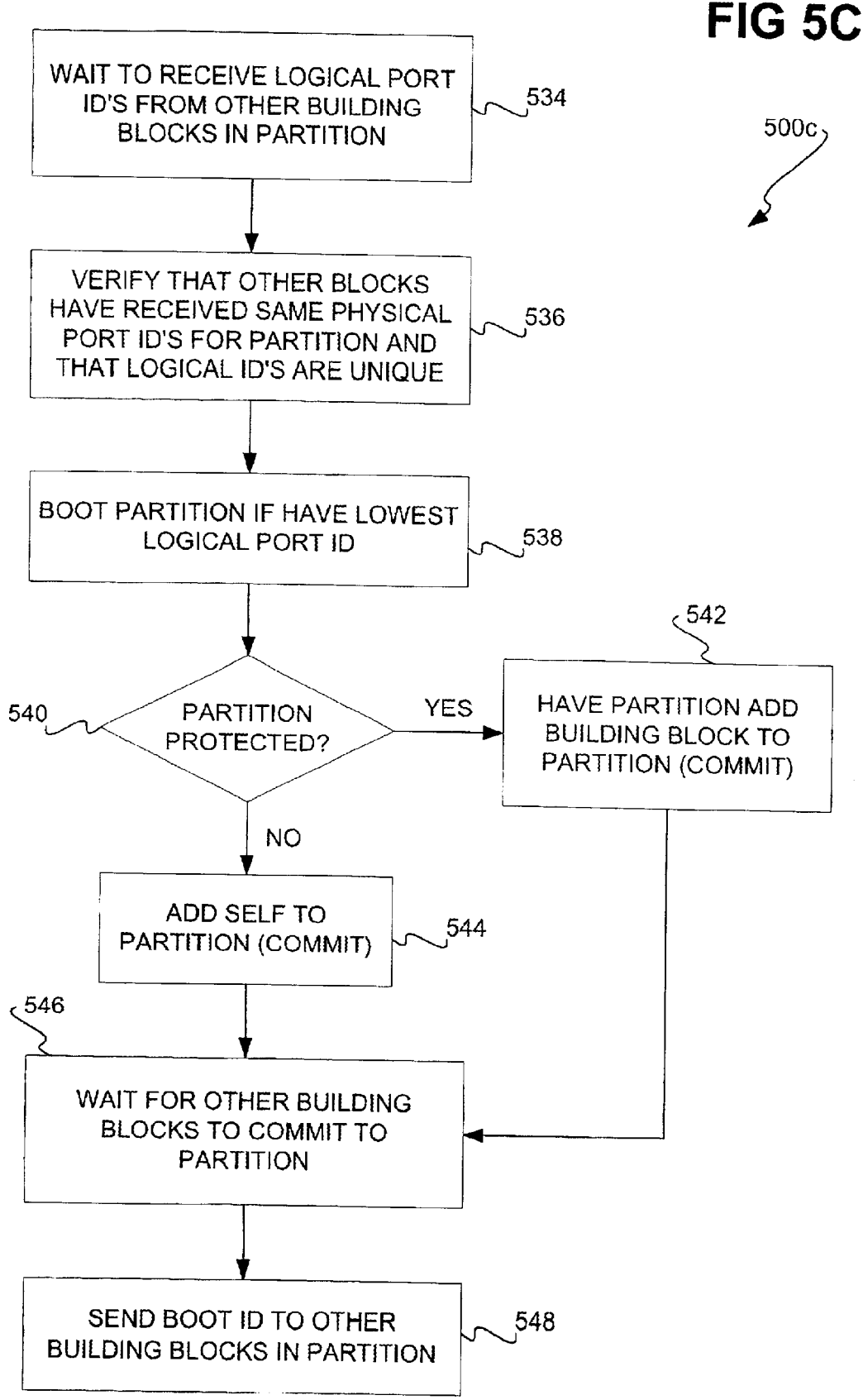

Referring next to FIG. 5C, the building block waits to receive the logical port identifiers from the other building blocks having the same partition identifier (534). This may entail the building block waiting for a long time for the other building blocks in the same partition to catch up and reinitialize their own software and hardware, where the status indicators of such building blocks can be examined to determine what they are currently doing. The building block then verifies that the other building blocks in the same partition have the same physical port identifiers indicating the same building blocks as belonging to the same partition (536). This verification ensures that all the building blocks having the same partition identifier have the same understanding as to the identities of the building blocks in this partition. Furthermore, the building block verifies that the logical port identifiers for these building blocks are unique.

If the building block performing the method 500c has the lowest logical port identifier, then it boots the partition (538). If the partition is protected (540), then the building block has the partition add it to the partition (542). That is, if the partition has already been protected by another building block, the building block performing the method 500c is added to the partition by the partition. This may be accomplished by online removal/insertion (OLRI) software running on the partition. However, if the partition is not yet protected (540), then the building block adds itself to the partition (544). In either case, the building block's commit indicator now indicates that the building block has been committed to the partition.

The building block next waits for a relatively short period of time for the other building blocks having the same partition identifier to commit to the partition (546). This can be accomplished by the building block examining the commit indicators of the other building blocks in the same partition, and waiting until all these indicators indicate that their respective blocks have committed to the partition. The building block also sends the boot identifier to the other building blocks in the same partition (548). The boot identifier is the smallest in value logical port identifier of the logical port identifiers of the building blocks having the same partition identifier. The boot identifier thus identifies the building block that is responsible for booting the partition, i.e., the boot building block.

Figure 5D:
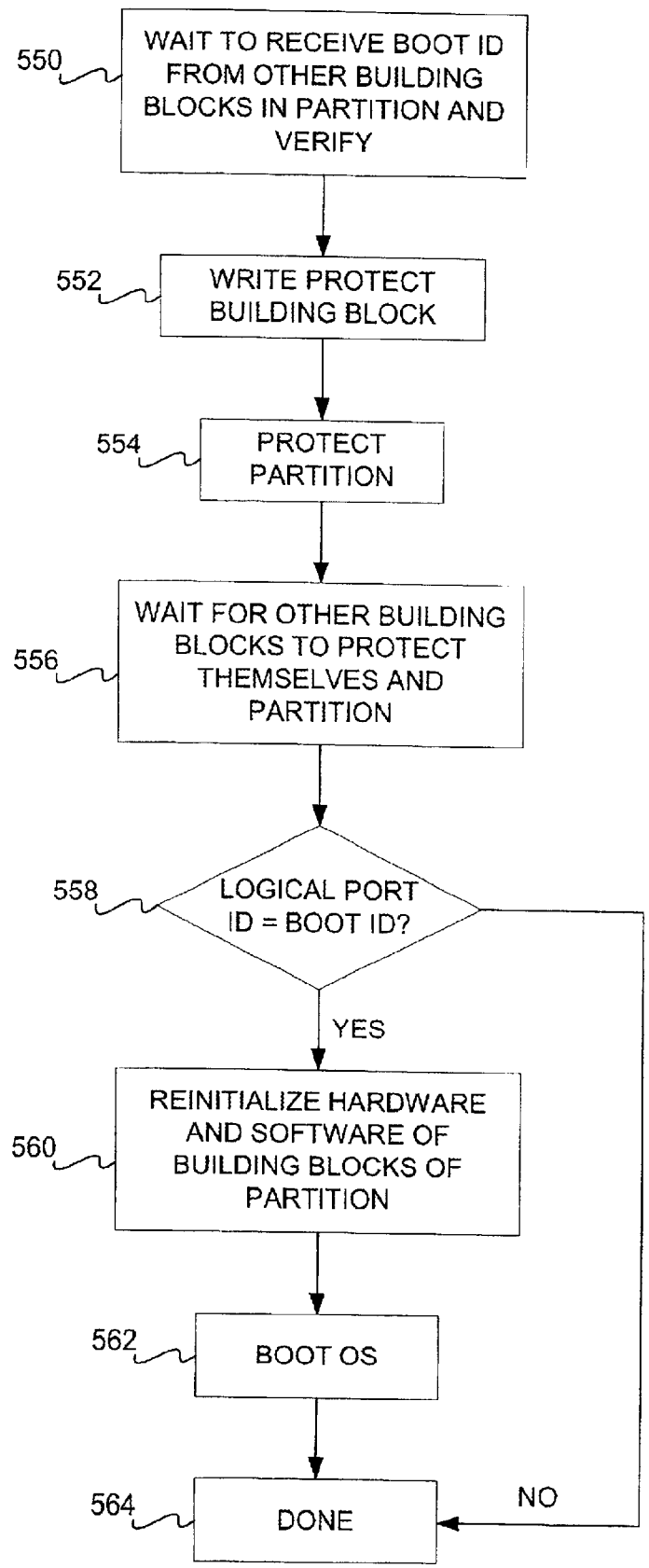

Referring finally to FIG. 5D, the building block waits to receive the boot identifier from the other building blocks in the same partition, and verifies that all these building blocks are indicating the same boot identifier (550). This verification is accomplished so that all the building blocks in the same partition have the same understanding as to which building block is responsible for booting the partition. The building block may wait for a relatively long period of time to receive the boot identifier from each of the other building blocks in the same partition. After verification, the building blocks of the partition can be accessed from anywhere else in the partition, such that there is a single memory map for the entire partition. Therefore, the software of these building blocks is reinitialized with the memory map for the partition.

The building block next write protects itself (552), as well as protects the partition (554). After write protecting itself, the building block has a protect indicator that indicates that the building block has been protected. The partition is protected from other building blocks, such that only the partition itself can subsequently add new building blocks to the partition. Such addition of new building blocks to the partition can be accomplished, for instance, by OLRI software running on the partition. The building block waits for the other building blocks in the same partition to protect themselves and the partition (556), by, for example, examining the protect indicators of these building blocks. This wait may be for a relatively short period of time.

If the logical port identifier of the building block is not the boot identifier (558), then the method 500d is finished (564). Otherwise, the BSP of the building block becomes the BSP for the partition, reinitializes all the hardware and software of the building blocks of the partition (560), and boots the operating system instance for the partition (562), before finishing (564). If the building block currently performing the method 500d is not the boot building block for the partition, then another building block in this partition performs 560 and 562 to initialize the partition and its operating system instance.

Removing Building Blocks from Partitions

Figure 6:
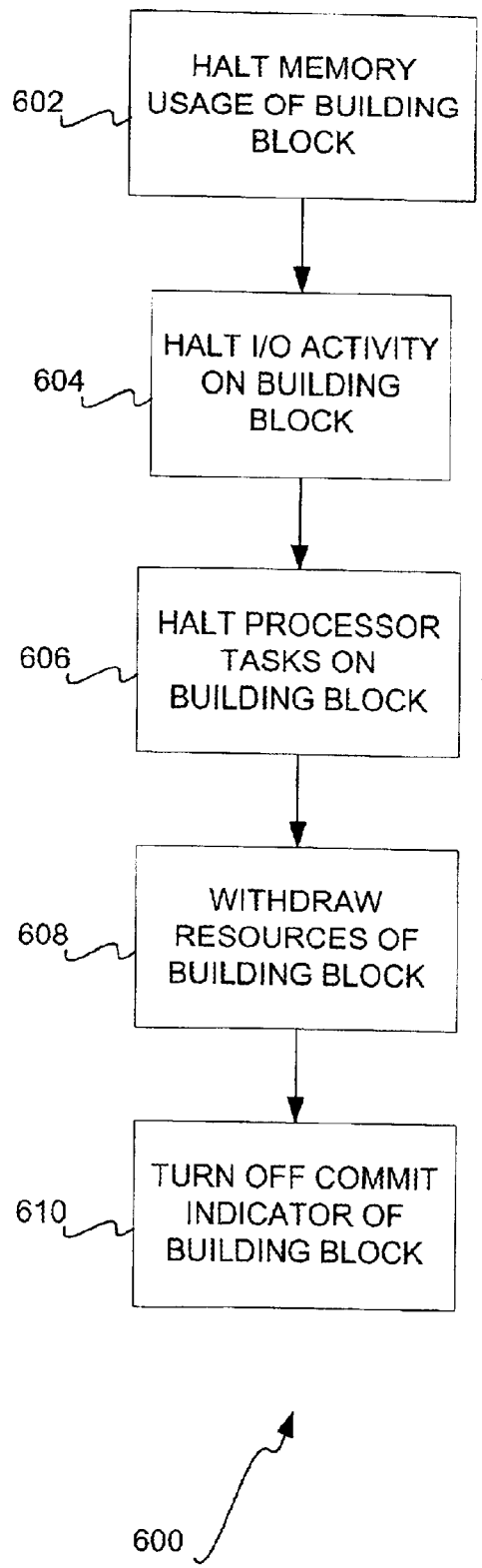
FIG. 6 is a flowchart of a method for removing a building block from a partition, according to an embodiment of the invention, and is consistent with the method of FIG. 1.

FIG. 6 shows how one embodiment of the invention unbinds, or removes, building blocks of a platform from partitions of the platform, as the method 600. The approach detailed in these figures is consistent with that of the method 100 of FIG. 1. The method 600 is performed by a building block of the platform. The building block's status indicator is updated throughout the performance of the method 600, to reflect the building block's current status. First, memory usage of the building block is halted (602). That is, the memory of the building block can no longer be used by other building blocks within the same partition.

Next, I/O activity on the building block is also halted (604). The building block thus cannot receive input from or provide output to other building blocks having the same partition identifier. Processor tasks on the building block are also halted (606). Such processor tasks may include those assigned by the partition for performance by the building block. The resources of the building block are then withdrawn from the partition (608). These resources can include the processing capability of the building block, the memory of the block, the storage of the block, and so on. Finally, the commit indicator of the building block is turned off (610), to indicate that the building block is no longer bound to the partition.

Advantages over the Prior Art

Embodiments of the invention allow for advantages over the prior art. Embodiments are more fault tolerant than approaches for binding building blocks to partitions that employ a master building block, because the failure of any one building block does not prevent the others from properly binding to their respective partitions. Furthermore, although embodiments of the invention employ a masterless approach for binding building blocks to partitions, race conditions are avoided through the use of the various identifiers and indicators of the building blocks that have been described. The building blocks are also protected from other building blocks, as well as from rogue software. The partitions themselves are also protected. Furthermore, the building blocks can be removed from the partitions to which they have been joined.

Alternative Embodiments

It will be appreciated that, although specific embodiments of the invention have been described herein for purposes of illustration, various modifications may be made without departing from the spirit and scope of the invention. For instance, whereas the invention has been described as capable of being implemented on NUMA systems, it can also be implemented in conjunction with other types of multi-processor systems. As another example, the invention has been particularly described with reference to a particular manner for binding building blocks to partitions in conjunction with FIGS. 5A–5D, and with reference to a particular manner for removing building blocks from partitions in conjunction with FIG. 6. However, the invention encompasses manners for binding and unbinding building blocks to and from partitions that vary from the manners depicted in FIGS. 5A–5D and FIG. 6, respectively. Accordingly, the scope of protection of this invention is limited only by the following claims and their equivalents.

We claim:

1. A method for removing a building block of a platform from a partition of the platform comprising:
   halting activity by the partition on the building block, the partition indicated by a first partition identifier of the building block, the building block having joined the partition in a masterless manner;
   withdrawing resources of the building block from the partition; and,
   deauthorizing the building block from the partition,
   wherein the masterless manner uses the first partition identifier, a first physical port identifier indicating a physical location of the building block in the platform, and a first logical port identifier indicating a logical location of the building block in the partition identified by the first partition identifier, and second partition identifiers, second physical port identifiers, and second logical port identifiers of other building blocks of the platform.

2. The method of claim 1, wherein halting the activity by the partition on the building block comprises halting usage of memory of the building block by the partition.

3. The method of claim 1, wherein halting the activity by the partition on the building block comprises halting input/output (I/O) activity on the building block.

4. The method of claim 1, wherein halting the activity by the partition on the building block comprises halting process or tasks running on the building block.

5. The method of claim 1, wherein deauthorizing the building block from the partition comprises turning off a commit indicator of the building block.

6. The method of claim 1, wherein the masterless manner comprises:
   waiting for the other building blocks for a length of time based on whether the other building blocks are resetting or rebooting themselves; and,
   receiving from the other building blocks the second physical port identifiers and the second partition identifiers.

7. The method of claim 1, wherein the masterless manner comprises:
   waiting for the subset of the other building blocks for a length of time based on whether the subset of the other building blocks are reinitializing hardware and software of the subset of the other building blocks; and,
   receiving from the subset of the other building blocks the second logical port identifiers.

8. The method of claim 1, further initially comprising joining the partition in the masterless manner.

9. A system comprising:
   a platform;
   a plurality of building blocks of the platform, each building block having a physical port identifier indicating a physical location in the platform, a partition identifier, and a logical port identifier indicating a logical location in a partition identified by the partition identifier; and,
   a plurality of partitions of the platform, the partition identifier of each of the plurality of building blocks indicating one of the plurality of partitions to which the building block is bound in a masterless manner using the physical port identifiers, the logical port identifiers, and the partition identifiers of the plurality of building blocks,
   where one of the plurality of building blocks is removed from the one of the plurality of partitions indicated by the partition identifier of the one of the plurality of building blocks to which the one of the plurality of building blocks has been bound.

10. The system of claim 9, wherein the one of the plurality of building blocks is removed from the one of the plurality of partitions by at least halting activity by the one of the plurality of partitions on the one of the plurality of building blocks.

11. The system of claim 9, wherein the one of the plurality of building blocks is removed from the one of the plurality of partitions by at least withdrawing resources of the one of the plurality of building blocks from the one of the plurality of partitions.

12. The system of claim 9, wherein the one of the plurality of building blocks is removed from the one of the plurality of partitions by at least deauthorizing the building block from the partition.

13. The system of claim 9, wherein each building block further has a protect indicator indicating whether the building block is currently write protected.

14. The system of claim 9, wherein each building block further has a commit indicator indicating whether the building block is currently bound to the one of the plurality of partitions indicated by the partition identifier of the building block.

15. The system of claim 14, wherein the commit indicator of the one of the plurality of building blocks removed from the one of the plurality of partitions is turned off upon removal of the one of the plurality of building blocks from the one of the plurality of partitions.

16. The system of claim 9, wherein each building block further has a status indicator indicating a current status of the building block.

17. An article comprising:

a computer-readable medium; and, means in the medium for removing a building block of a platform from a partition of the platform indicated by a first partition identifier of the building block and to which the building block has joined in a masterless manner by using the first partition identifier, a first physical port identifier indicating a physical location of the building block in the platform, and a first logical port identifier indicating a logical location of the building block in the partition identified by the first partition identifier, and second partition identifiers, second physical port identifiers, and second logical port identifiers of other building blocks of the platform.

18. The article of claim 17, wherein the means removes the building block of the platform from the partition of the platform by at least halting activity by the one of the plurality of partitions on the one of the plurality of building blocks.

19. The article of claim 17, wherein the means removes the building block of the platform from the partition of the platform by at least withdrawing resources of the one of the plurality of building blocks from the one of the plurality of partitions.

20. The article of claim 17, wherein the means removes the building block of the platform from the partition of the platform by at least deauthorizing the building block from the partition.

21. The article of claim 17, wherein the medium is one of a modulated carrier signal and a recordable data storage medium.

* * * * *